United States Patent [19]

Kurozu et al.

[11] 4,068,890
[45] Jan. 17, 1978

[54] SEAT LOCK DEVICE

[75] Inventors: Toshio Kurozu, Chigasaki; Shinjiro Yamada; Norio Miyashita, both of Tokyo, all of Japan

[73] Assignees: Mitsui Mining & Smelting Co., Ltd.; Honda Motor Co., Ltd., both of Tokyo, Japan

[21] Appl. No.: 792,239

[22] Filed: Apr. 29, 1977

[30] Foreign Application Priority Data

May 19, 1976 Japan .................................. 51-56655

[51] Int. Cl.² ............................................ A47C 1/024
[52] U.S. Cl. .................................... 297/355; 297/367; 297/379
[58] Field of Search ................ 297/355, 379, 367–369, 297/378, 328; 296/65 R, 66, 69

[56] References Cited

U.S. PATENT DOCUMENTS

| 425,778 | 4/1890 | Goetel | 297/367 |
|---|---|---|---|
| 3,262,725 | 7/1966 | Ballantyne | 297/379 X |
| 3,410,600 | 11/1968 | Thorpe | 297/379 X |
| 3,784,252 | 1/1974 | Peterson | 297/355 X |

Primary Examiner—Roy D. Frazier
Assistant Examiner—William E. Lyddane
Attorney, Agent, or Firm—Flynn & Frishauf

[57] ABSTRACT

A seat lock device which comprises a lock unit fixed on each side of a back rest swingable back and forth and at a point spaced from a seat shaft and a plurality of strikers engageable with the lock unit, and wherein the lock unit includes elongate grooves engageable with the strikers and lock grooves; a circular actuating unit provided with elongate grooves engageable with the strikers and lock grooves, held at a free position ready for engagement with the striker when the elongate groove remains disengaged from the striker and rotated when the elongate groove is engaged with the striker; a latch for locking the lock groove by engagement therewith when the circular actuating unit is rotated to a lock position; a gate mechanism for preventing the lock action of the latch when the elongate groove remains disengaged from the striker; and a releasing mechanism for releasing the lock action of the latch, thereby enabling the back rest to be locked in an inclined position corresponding to any of the strikers engaged with any of the elongate grooves.

5 Claims, 11 Drawing Figures

SEAT LOCK DEVICE

BACKGROUND OF THE INVENTION

This invention relates to a seat lock device for stepwise locking in a desired inclined position a swingable member or back rest of a rear seat of, for example, an automobile which is rotatably supported on a shaft mounted on an immovable member.

Various types of seat lock device proposed to date have the drawbacks that since the seat lock device lies very close to a pivotal shaft of a seat, a tremendous force is applied on the seat lock device where the back rest is suddenly locked or subjected the heavy load, probably leading to the damage of said seat lock device and in consequence making it necessary to manufacture the seat lock device with an extremely great mechanical strength.

To eliminate the above-mentioned drawbacks, there was devised a seat lock device for locking a back rest at a point spaced from the pivotal shaft of the seat. However, this prior art seat lock device failed to meet a demand for a seat lock device of simple construction capable of changing the inclined position of the back rest in a plurality of stages. For example, with a light van type automobile provided with a cargo section behind a rear seat, the back rest of the rear seat is so supported as to swing back and forth. Hitherto, however, the back rest could only take two positions, that is, a normal position adapted for a rider to be seated and a position thrown forward in a substantially horizontal direction to enlarge a floor space for carriage of a large amount of cargo. Further disadvantages of the prior art seat lock device are that where it is desired to carry a large amount of cargo, the back rest can not be changed and held in the upright position, but has to be folded substantially flat, preventing a rider from being seated on a rear seat, and that where a small amount of cargo is carried, the rider can not enjoy a comfortable seated position by reclining the back rest backward from the normal position.

SUMMARY OF THE INVENTION

It is therefore the object of this invention to provide a seat lock device capable of locking a back rest in many stages without being subjected to an unduly large stress.

To attain the above-mentioned object, a seat lock device of this invention comprises a lock unit fitted to one member of an immovable member and a swingable member or back rest of a seat supported by a pivotal shaft mounted on the immovable member and at a point spaced from the pivotal shaft; a plurality of strikers erected on the other member of the immovable member and the swingable member along the circumference of a circle centered at the pivotal shaft, wherein the lock unit includes a case; a substantially circular actuating unit pivotally supported by the case to be rotated in engagement with any of the strikers; lock means for locking the actuating unit when it is rotated to a lock position; a direction-setting unit for rotating the actuating unit to set it at a free position ready for engagement with any of the strikers while the actuating unit remains disengaged from said strikers; a gate member for preventing the lock action of the lock means while the actuating unit remains disengaged from the striker; and releasing mechanism for releasing the lock action of the lock means.

The seat lock device of this invention in which the lock unit is positioned apart from the pivotal shaft of a back rest of, for example, a light van type automobile has the advantages that a large number of strikers can be provided, thereby enabling the back rest to be locked in many inclined positions; where the back rest continues to be rapidly inclined without being locked, the lock unit is prevented by the gate mechanism from taking a lock position, so long as the lock mechanism is not engaged with the striker; since a relatively small force generally has only to be applied on the lock unit and strikers, both strikers and the lock unit can have simple structures and in consequence light weight and considerable durability; and a rider can be seated on the rear seat comfortably without any obstruction.

This invention eliminates the drawbacks accompanying the prior art back rest of a rear seat due to the above-mentioned advantageous characteristics and can be effectively applied to the back rest of the rear seat of a light van type automobile.

A circular actuating unit, lock mechanism, direction-setting unit and gate mechanism used with a seat lock device according to a preferred embodiment of this invention are constructed as described below.

The circular actuating unit has its outer periphery provided with two lock grooves and two elongate grooves engageable with strikers. The lock means comprises a latch so urged as to be engaged with at least one of the lock grooves when the circular actuating unit is rotated through a prescribed angle in either direction. The direction-setting unit includes a tension spring, one end of which is fixed to the case of a lock unit and the other end of which is fitted to an eccentric point on the circular actuating member.

The gate mechanism comprises a gate member, which has two first arms and two second arms, and is fitted to the backside of the circular actuating unit to be rotated concentrically therewith. Where the elongate groove remains disengage from the striker, the first and second arms protrude into the corresponding elongate groove and lock groove to prevent the latch of the lock means from being engaged with the lock groove. Where the elongate groove is engaged with the striker, the two first arms are rotated by being pushed by the striker in a circumferential direction to cause one of the second arms to be retracted from the lock groove into which the latch of the lock means is to be inserted, thereby allowing the latch to be easily engaged with said lock groove.

DETAILED DESCRIPTION OF THE INVENTION

Figure 1:
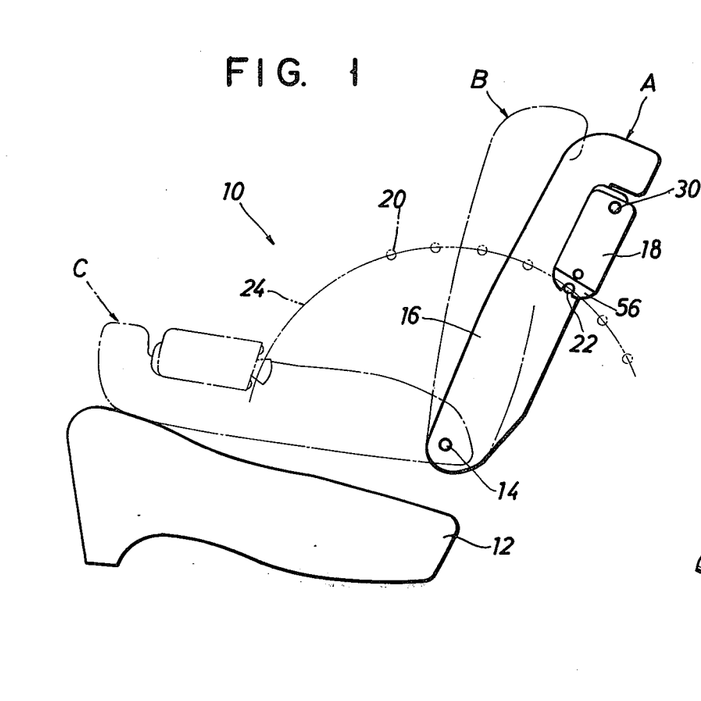
FIG. 1 is a side elevation of a back rest of a rear seat of a light van type automobile and fitted with the seat lock device of this invention.
Figure 2:
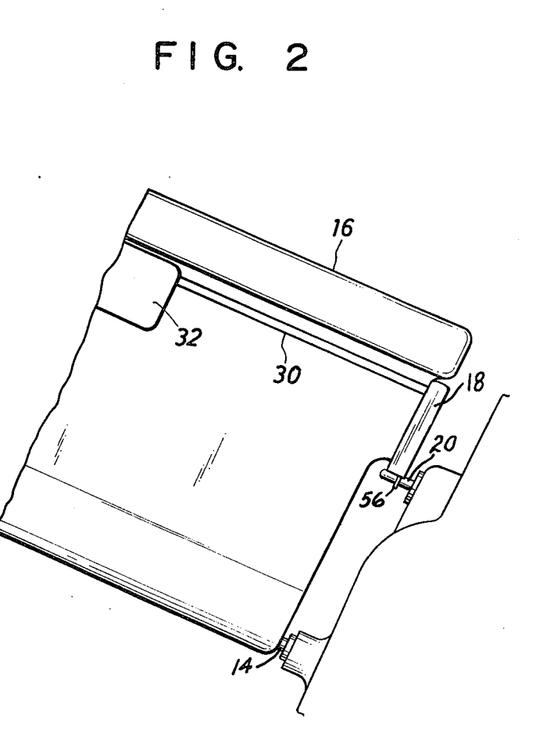
FIG. 2 is a back view showing one lateral side of the back rest of FIG. 1.
Figure 3:
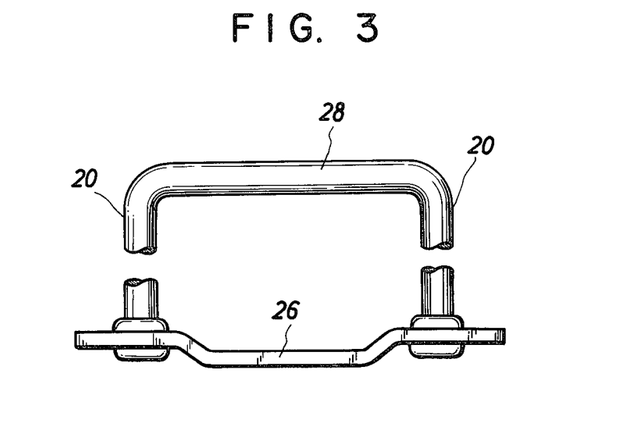
FIG. 3 is a front view of two strikers assembled into a unit.
Figure 4:
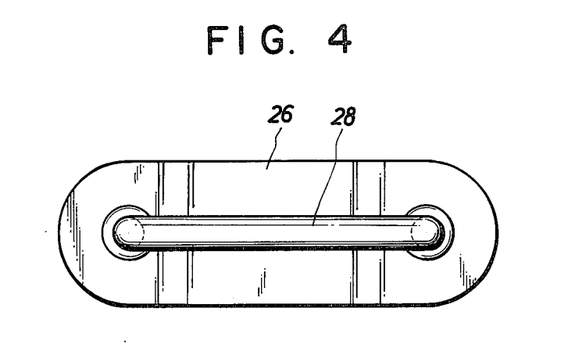
FIG. 4 is a plan view of the assembled strikers of FIG. 3.

The following description relates to the case where a seat lock device according to the preferred embodiment of this invention is applied to a back rest of a rear seat of a light van type automobile. Referring to FIGS. 1 and 2, a rear seat 10 comprises a back rest 16 supported by a seating section 12 and pivotal shaft 14 so as to be inclined back and forth. Both lateral sides of the back rest 16 are fitted with a pair of lock units 18. A plurality of strikers 20 are projectively provided on both inner walls of an automobile at a proper space along a locus 24 traced by that part 22 of the lock unit engaged with the striker 20 which is shifted according to a predetermined desired degree to which the back rest 16 of the rear seat is inclined. The lock units 18 and strikers 20 on both sides of the rear seat have the same structure and function. For briefness, therefore, FIGS. 1 and 2 indicate said members 18, 20 provided only on one lateral side of the rear seat, the following description being limited thereto. As seen from FIGS. 3 and 4, the strikers 20 are erected on a base plate 26 for easy fitting to an automobile body. The ends of every two adjacent strikers 20 are connected by a connector 28 for reinforcement as well as for safety.

Referring to FIG. 1, the character A denotes the normal position of the back rest 16 of the rear seat, the character B the upright position, and the character C the forward thrown position. The lock units 18 on both sides of the rear rest are connected by a control rod 30 provided behind the back rest 16 of the rear seat. Rotation of a handle 32 fitted to the center of the central rod 30 releases the lock unit 18 from the strikers 20, enabling the back rest 16 to be easily shifted to any predetermined desired inclined position.

Figure 5:
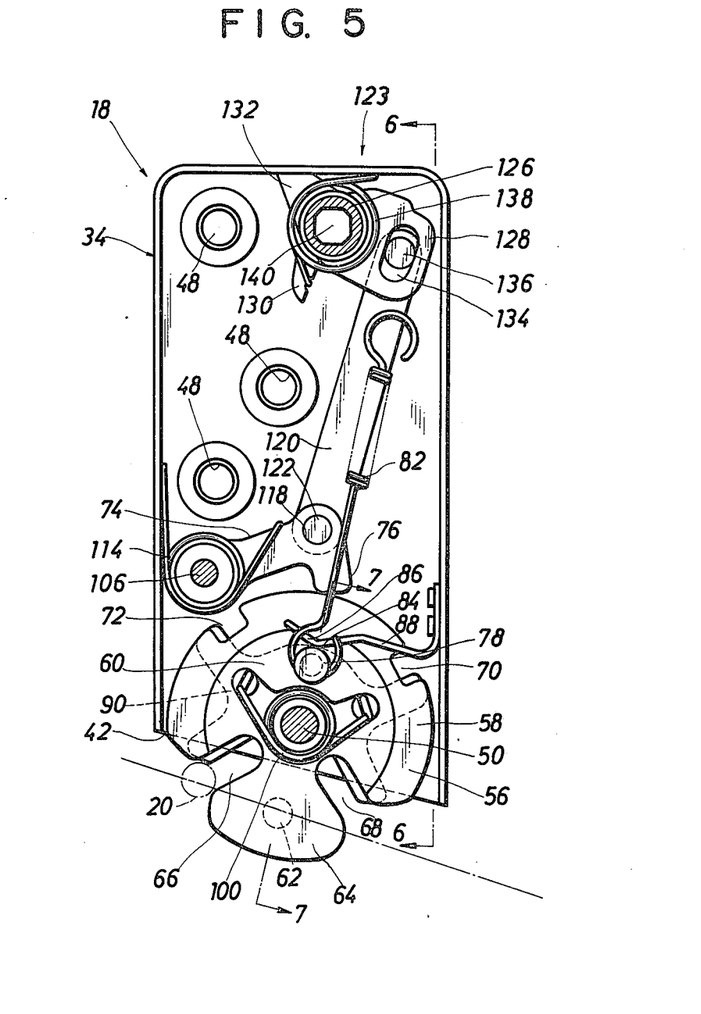
FIG. 5 is a front view, partly in section, of the interior of a lock unit when disengaged from the striker.
Figure 6:
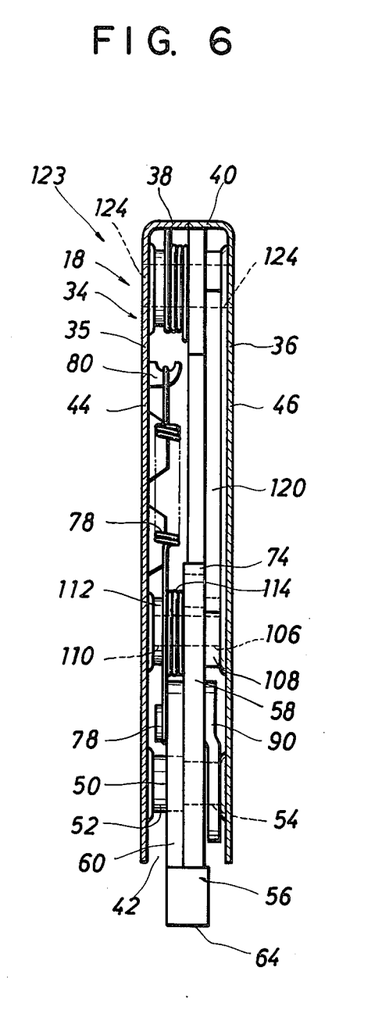
FIG. 6 is a lateral sectional view on line I—I of FIG. 5.
Figure 7:
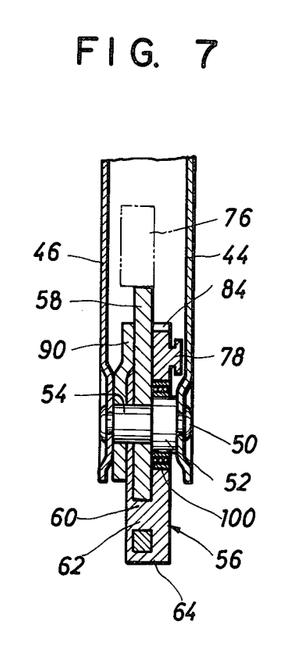
FIG. 7 is a lateral sectional view on line II—II of FIG. 5, showing the circular actuating unit of FIG. 6 in enlargement.

The lock unit 18 comprises a case 34 as shown in FIGS. 5 to 7. The case 34 is formed of a pair of substantially symmetric covers 35, 36 (FIG. 6). Both covers detachably abut against each other along three bent horizontal edges and jointly constitute a flat box provided with an opening 42 at one lengthwise end. The numerals 44, 46 are the base plates of the covers 35, 36. The base plates 44, 46 of the covers 35, 36 are bored with a plurality of through holes 48 (FIG. 5). The case is fitted to the frame of the back rest 16 by threadedly inserting fitting screws (now shown) into the threaded portion of said frame through the holes 48.

A pivotal shaft 50 of a substantially circular actuating unit 56, both ends of which are fixed to the covers 35, 36 penetrates crosswise the case 34 at a point near the opening 42 of said case 34. The pivotal shaft 50 is formed of a larger diameter section 52 and a smaller diameter section 54 (FIG. 7). The substantially circular actuating unit 56 is rotatably supported on the smaller diameter section 54 of the pivotal shaft 50. The circular actuating unit 56 comprises a rotatable member 58 and a direction-setting member 60 engageable with both sides of said rotatable member 58. The rotatable member 58 and direction-setting member 60 are joined by a pin 62.

The circular actuating unit 56 comprises a pair of elongate grooves 66, 68 which are cut out radially from two circumferentially spaced points through the rotating member 58 and direction-setting member 60 for engagement with any of the strikers 20. These elongate grooves 66, 68 jointly constitute an intervening segmental section 64. The two elongate grooves 66, 68 are positioned symmetric with respect to a bisector of the segmental section 64 which passes through the center of the pivotal shaft 50. Two lock grooves or notches 70, 72 are cut out on the peripheral edge portion of the rotating member 58 at a point circumferentially spaced 180° from the corresponding elongate grooves 66, 68. The striker 20 rotates the actuating unit 56 when engaged with either of the elongate grooves 66, 68. When the actuating unit 56 is rotated through a prescribed angle by engagement between the elongate groove 66 or 68 and the striker 20, then the notch 70 or 72 is engaged with the engagement section 76 of the latch 74 of the later described lock means, thereby stopping the rotation of the actuating member 56. In this case, the angle which the elongate groove 66, or 68 defines with the center of the pivotal shaft 50 may be suitably chosen.

The direction-setting unit includes a tension spring 82 and a pin 78 erected on a bisector of an angle defined by the elongate grooves 66, 68 of the segmental section 64 (said bisector is hereinafter referred to as "a central line of the actuating unit"). Unless the striker 20 is not engaged with the elongate groove 66 or 68, the direction-setting member 60 and in consequence the actuating unit 56 are urged by the tension spring 82 stretched between the pin 78 and a hook 80 (FIG. 6) provided on the cover 35 toward the free position of said actuating unit 56, that is, in the direction in which the central line of the actuating unit 56 substantially faces the pivotal shaft 14 of a rear seat. The free position of the actuating unit 56 is that in which the elongate groove 66 or 68 is ready to be easily engaged with the striker 20 approaching along the locus 24 traced by the engagement pin 22 between the lock unit 18 and striker 20 when the back rest 16 is inclined, with the opening of said elongate groove 66 or 68 directed toward said locus 24.

That part (best shown in FIG. 8) of the peripheral edge of the direction-setting member 60 which lies on the central line of the actuating unit 56 is provided with a depression 84. This depression 84 is engaged with a bent portion 86 formed at one end of a plate spring 88, the other end of which is fitted to the peripheral edge of the cover 35, thereby suppressing the shaking of the actuating unit 56 resulting from its inertia and the tensile force of the tension spring 82.

A gate member 90 is supported on the smaller diameter section 54 of the pivotal shaft 50 so as to be rotated relatively to the actuating unit 56. The gate member 90 prevents the engagement section 76 of the latch 74 from being engaged with the notch 70 or 72 when the striker 20 remains disengaged from the elongate groove 66 or 68. As shown in enlargement in FIG. 8, the gate member 90 comprises two first arms 92, 94 and two second arms 96, 98 extending substantially in a radial direction. While the striker 20 remains disengaged from the elongate groove 66 or 68, a coil spring 100 so urges the first arms 92, 94 as to cause the mutually facing sides thereof to protrude into the corresponding elongate grooves 66, 68 from those parts of the inner walls thereof which lie close to the first arms 92, 94, thereby narrowing the width of the elongate grooves 66, 68. The coil spring 100 also so urges the second arms 96, 98 as to cause the mutually facing sides thereof to protrude into the corresponding notches 70, 72 from those parts of the inner walls thereof which lie close to the second arms 96, 98, thereby narrowing the width of the notches 70, 72. The ends of the first arms 92, 94 and those of the second arms 96, 98 extend substantially up to the peripheral edge of the rotating member 58. A circle defined by an imaginary line passing the ends of the second arms 96, 98 has a slightly smaller diameter than the circular rotating member 58. The larger diameter section 52 of the pivotal shaft 52 is loosely inserted into the coil spring 100. Both ends of the coil spring 100 are loosely inserted into through holes 102, 102 bored in the actuating unit 56 and elongate holes 104, 104 cut out in the gate member 90 (FIG. 8) to be coaxially arranged with said through holes 102. The through holes 102, 102 and the elongate holes 104, 104 have substantially the same length in the circumferential direction. Both ends of the coil spring 100 are so urged as to be removed from each other. While, therefore, the striker 20 remains disengaged from the elongate groove 66, or 68, the gate member 90 and rotating member 58 are so positioned that the first arms 92, 94 protrude into the corresponding elongate grooves 66, 68 substantially to the same extent from those parts of the inner walls of the elongate grooves 66, 68 which lie close to said first arms 92, 94, and the second arms 96, 98 protrude in the corresponding notches 70, 72 substantially to the same extent from those parts of the inner walls of the notches 70, 72 which lie close to said second arms 96, 98. The above-mentioned position of the gate member 90 remains free relative to the actuating unit 56 while it remains disengaged. Where the striker 20 is engaged with the elongate groove 66 or 68, then the first arm 92 or 94 is pushed clockwise or counterclockwise relative to the coil spring 100. At this time, the second arm 96, or 98 protrudes into the elongate groove 66, or 68 to a smaller extent in the circumferential direction, thereby broadening the opening of the notch 70 or 72. The other second arm 98 or 96 protrudes into the corresponding elongate groove 68 or 66 to a larger extent in the circumferential direction, thereby narrowing the opening of the notch 72 or 70.

In the case 34, a pivotal shaft 106, both ends of which are fixed to the base plates 44, 46 of the covers 35, 36 is disposed close to the periphery of the circular actuating unit 56 (FIG. 5). That part of the pivotal shaft 106 which faces the cover base plate 46 is made into a larger diameter section 108, and that part of the pivotal shaft 106 which faces the cover base plate 44 is made into a smaller diameter section 110. That part of the smaller diameter section 110 which faces the cover base plate 46 is fitted with the latch 74, and that part of the smaller diameter section which faces to cover base plate 44 is provided with a spacer 112. The latch 74 is rotatably supported on the smaller diameter section 110 so as to take a lock position for engagement with the notch 70 or 72 of the rotating member 58 and a free position disengaged therefrom. The spacer 112 is loosely inserted into a coil spring 114, one end of which is fixed to the inner wall of the lateral edge 38 of the cover 35, and the other end of which is fixed to the latch 74. Therefore, the latch 74 is urged clockwise of FIG. 5, namely, toward the lock position. A clockwise projecting engagement section 76 (FIG. 5) is provided at the end of the latch 74. This engagement section 76 is detachably engaged with the notch 70 or 72 when the notch is brought to a point facing said engagement section 76.

The curved planes of the engagement section 76 extending in the radial direction and the curved inner walls of the notch 70, or 72 extending similarly in the radial direction which are engaged with each other jointly define an arcuate cylindrical form in which imaginary circles defined by said curved walls and curved inner walls are centered at the pivotal shaft 106. Where, therefore, the circular actuating member 56 or the rotating member 58 is rotated after once locked, the above-mentioned engagement between the engagement section 76 and the notch 70 or 72 is not released. The latch 74 is bored with a through hole 118, into which a pin 122 erected at one end of a connector 120 belonging to a releasing mechanism is rotatably inserted. A shifting mechanism 123 constitutes the releasing mechanism together with the connector 120 and is designed vertically to move said connector 120. The shifting mechanism 123 is received in the case 34 near the upper end thereof as shown in FIG. 5. The cover base plates 44, 46 are bored with a through hole 124 (FIG. 6), into which a sleeve 126 (FIG. 5) is rotatably inserted. The sleeve 126 is provided with three integrally formed arms 128, 130, 132. The end of the arm 128 is bored with an arcuate elongate hole 134 into which a pin 136 erected on the connector 120 is slidably inserted. One end of a coil spring 138 provided on the periphery of the sleeve 126 is engaged with the arm 130. The other end of the coil spring 138 is pressed against the inner wall of the lateral side 38 of the cover 35, thereby urging the sleeve 126 clockwise of FIG. 5. The end of the arm 132 is normally pressed against the inner wall of the lateral side 40 of the cover 36, thereby restricting the clockwise rotation of the sleeve 126. The sleeve 126 is bored with a through hole 140 having a rectangular cross section and extending axially of said sleeve 126.

A shaft provided at the end of the control rod 30 (FIG. 1) with a rectangular cross section is inserted into the hole 140 having a rectangular cross section, and extending axially of the sleeve 126. Therefore, the sleeve 126 is rotated by the turn of the control rod 30.

Figure 10:
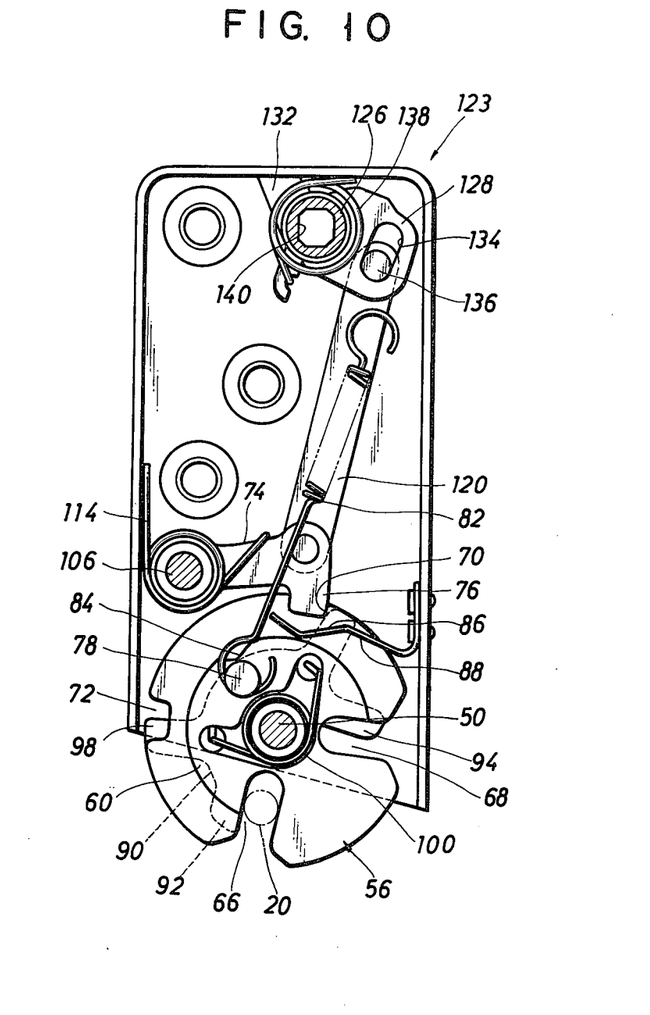
FIG. 10 is a front sectional view of the lock unit of FIG. 5 when the striker is locked by the lock groove.

There will now be described the operation of the striker 20 and lock unit 18. Where the striker 20 remains disengaged, as shown in FIG. 5, from the elongate hole 66, or 68 of the actuating unit 56, then the actuating unit 56 continues to be urged to a free position by the tensile force of the tension spring 82. At this time, the bent portion 86 of the plate spring 88 is engaged with the depression 84 of the direction-setting member 60, thereby firmly holding the actuating unit 56 in a free position. The gate member 90 is also set in a free position relative to the actuating unit 56. The engagement section 76 of the latch 74 is pressed against the periphery of the rotating member 58 of the actuating unit 56 by the action of the coil spring 114.

Where the back rest 16 of FIG. 1 is thrown forward, then the lock unit 18 is shifted to the left side of FIG. 5. At this time, the striker 20 occupying a forward position is carried into the elongate groove 66, causing the actuating unit 56 to be rotated counterclockwise. Where the back rest 16 is thrown further forward, then full engagement takes place between the striker 20 and elongate groove 66 by the shifting of the striker 20 to the deepest portion of said elongate groove 66 as shown in FIG. 10. As the result, the notch 70 is made to face the engagement section 76 of the latch 74. This position of the notch 70 corresponds to the lock position of the actuating unit 56. Since, at this time, the striker 20 is already engaged with the elongate groove 66, the gate member 90 is rotated clockwise relative to the actuating unit 56, causing the notch 70 to be left open. Therefore, the engagement section 76 of the latch 74 is inserted into the notch 70 by the action of the coil spring 114 to stop the rotation of the actuating unit 56, thereby causing the back rest 16 to take, for example, an upright position B (FIG. 1).

Figure 11:
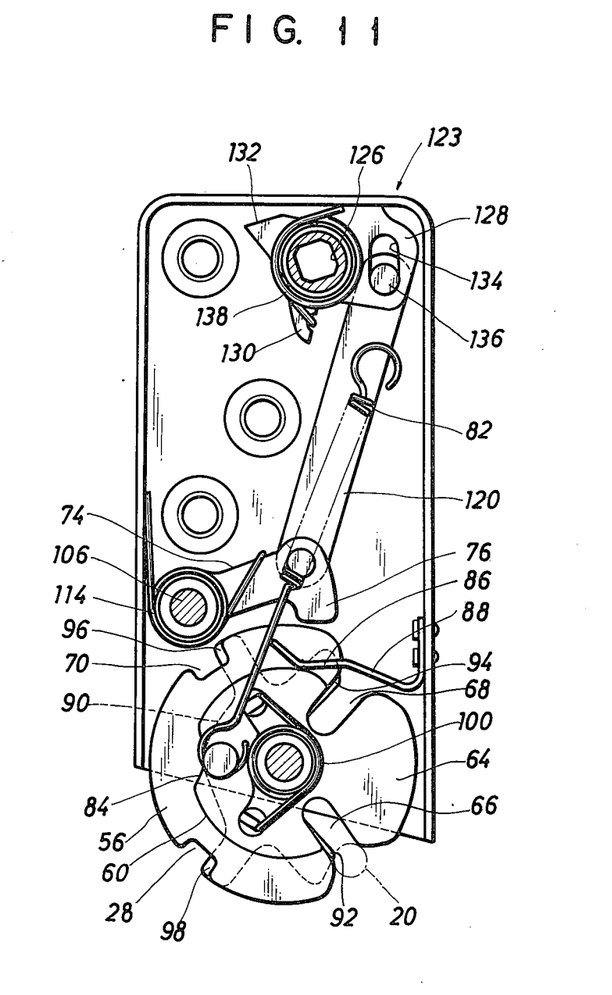
FIG. 11 is a front sectional view of the lock unit when the striker is just about to leave the circular actuating unit.

At this time, the pin 136 erected on the connector 120 is shifted to the lower end of the elongate hole 134. Where, therefore, the sleeve 126 is rotated counterclockwise until the arm 128 of the sleeve 126 substantially abuts against the inner wall of the lateral side 40 of the cover 36 as shown in FIG. 11, then the latch 74 is rotated counterclockwise by means of the connector 120 to release engagement between the notch 70 and the engagement section 76 of the latch 74. When the back rest 16 now made rotatable is thrown forward, then the actuating unit 56 is rotated to a position in which the striker is disengaged from the elongate groove 66 (FIG. 11). Where the actuating unit 56 is further rotated beyond the above-mentioned position, then the gate member 90 is brought to a free position relative to the actuating unit 56 by the action of the coil spring 100. The actuating member 56 itself also regains a free position. Where the above-mentioned operation is repeated for each striker or the handle 32 is continuously operated to throw the back rest 16 of a rear seat and the back rest 16 is set free immediately before each succeeding striker 20, then the back rest 16 can be finally brought to a desired forward position, for example, to a fully forward thrown position C of FIG. 1. FIG. 1 shows the arrangement of strikers 20 to enable the back rest 16 to be thrown slightly forward from its upright position B and further to be thrown slightly backward from a normal position A.

To restore the back rest 16 from the flat thrown position C to the upright position B, the following steps are taken. Namely, the handle 32 is continuously operated. The back rest 16 is pulled up while the latch 74 is withdrawn from the periphery of the rotating member 58 of the actuating unit 56. Immediately before the back rest 16 is brought to the upright position B, the handle 32 is returned to the original position. Where, under this condition, the back rest 16 is drawn near to the upright position B, the striker 20 corresponding to said upright position B is engaged with the elongate groove 68 to rotate the actuating unit 56 clockwise. Where full engagement takes place between the striker 20 and elongate groove 68, the first arm 94 and second arm 98 of the gate member 90 are rotated counterclockwise. The engagement section 76 of the latch 74 is engaged with the notch 72 now left open to stop the rotation of the actuating unit 56, thereby locking the back rest 16 in the upright position B. The shifting of the back rest 16 from its upright position B to its normal position A or to a position further thrown backward from the normal position A can be carried out in the same manner as described above.

With the seat lock device of this invention arranged as mentioned above, the back rest 16 can regain its original free position even when the back rest 16 is rotated by engagement with the striker 20, provided said striker 20 is disengaged from the elongate groove 66, or 68. Therefore, the elongate grooves 66, 68 have only to be provided one on each side of the segmental section 64, regardless of a number of strikers 20 used. Consequently, locking of the back rest 16 in many more or fewer stages can be effected simply by increasing or decreasing a number of strikers 20, and moreover by the same lock unit 18. Further, the lock unit 18 and strikers 20 which can be fitted in a place properly spaced from the pivotal shaft 14 of the back rest 16 enables a rider easily to get on or off a rear seat or be seated thereon without any obstruction. Further advantages of this invention are that a suitable selection of a distance between the lock unit 16 and the pivotal shaft 14 of the back rest 16 fully reduces stresses applied by an external force to the strikers 20 and the various parts of the lock unit 18; the seat lock device can be rendered compact, light, mechanically strong and durable and moreover admits of easy fitting and handling; and the back rest 16 of a rear seat can be locked in a fully large number of stages.

When the handle 32 is continuously operated and back rest 16 is rapidly thrown forward or backward, the striker 20 is engaged with the elongate groove 66, or 68 with the resultant rapid rotation of the actuating unit 56; consequently the actuating unit 56 tends to be excessively rotated due to its inertia even after the striker 20 is disengaged from the elongate groove 66 or 68, causing the notch 70 or 72 to be brought to a position facing the latch 74 with the possibility of undesired locking taking place when the handle 32 is returned to the original position. However, a seat lock device embodying this invention has the advantage that while the striker 20 remains disengaged from the elongate groove 66, or 68, the width of the notch 70, or 72 is narrowed as previously described, thereby preventing the engagement section 76 of the latch 74 from being engaged with the notch 70 or 72, so long as the striker 20 remains disengaged from the elongate groove 66 or 68, and consequently reliably eliminating the locking of the actuating unit 56 by the latch 74.

Figure 8:
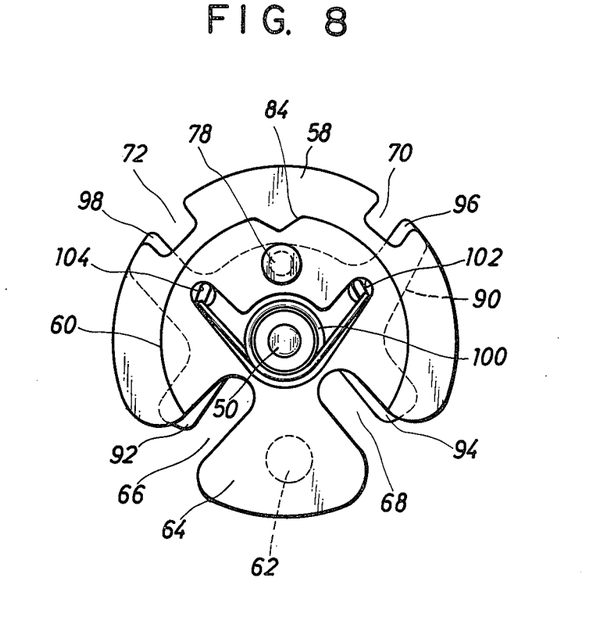
FIG. 8 is a front view of the circular actuating unit.

It will be noted that this invention is not limited to the foregoing embodiment but may also be applied to, for example, the seating section 12 itself of a rear seat. Further, this invention can be effectively utilized in defining the position or posture of a revolving body, linearly moving body or any other shifting body in a plurality of stages. Moreover, the strikers may be provided in a groove extending along the rotating locus of, for example, the actuating unit 56. This direction-setting member 60 and rotating member 58 may be formed in an integral body. Further, the depression 84 may be provided on the periphery of the rotating member 58 for engagement with the engagement section 76 of the latch 74, thereby omitting the plate spring 88. The first arms 92, 94 of the gate member 90 of FIG. 9 were made to protrude into the elongate grooves 66, 68 from the upper side thereof as shown in FIG. 8. Instead, the first arms 92, 94 may protrude into the elongate grooves 66, 68 from the lower side thereof.

Figure 9:
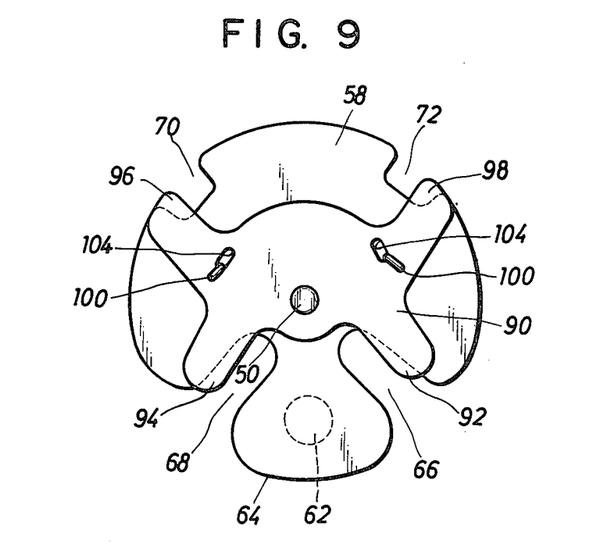
FIG. 9 is a back view of the circular actuating unit.

FIG. 9 is a back view of the actuating unit 56 of FIG. 8 and the gate member 90. In the case of FIG. 9, the second arms 96, 98 of the gate member 90 may protrude into the corresponding notches 70, 72 downward from the upper sides thereof on the opposite sides to those on which said second arms 96, 98 are indicated. Further, it is possible to set the second arms 96, 98 and notches 70, 72 in different positions from those shown in FIGS. 8 and 9 and change the shape of the latch 74, thereby shifting the engagement section 76 of the latch 74 to a point engageable with the notch 70 or 72. The actuating unit 56 and latch 74 may take such various shapes which permit easy engagement with each other. For example, the latch 74 may be of not only a rotatable type but also of a linearly movable type. Further, the releasing mechanism formed of the connector 120 and sleeve 126 may be changed into a different type. For example, the releasing mechanism may be formed of the control rod 30 and latch 74 coupled together directly or by a proper cam or any other means.

What we claim is:

1. A seat lock device comprising a lock unit fitted to one member of an immovable member and a swingable back rest member of a seat, the back rest member being rotatably supported by a pivotal shaft mounted on the immovable member and at a point spaced from the pivotal shaft; a plurality of strikers mounted on the other member of the immovable member and the swingable member along the circumference of a circle centered at the pivotal shaft for lockable engagement with the lock unit, wherein the lock unit includes a case; a substantially circular actuating unit pivotally supported by the case to be rotated into selective engagement with any of the strikers; lock means for locking the actuating unit when it is rotated to a lock position; a direction-setting unit for rotating the actuating unit to set it at a free position ready for engagement with an approaching striker while the actuating unit remains disengaged from all said strikers; a gate means for preventing the lock action of the lock means while the actuating unit remains disengaged from all the strikers; and a releasing mechanism for releasing the lock action of the lock means.

2. The seat lock device according to claim 1, wherein the actuating unit comprises two elongate grooves cut out in a radial direction on the periphery of the substantially circular actuating unit at spaced points to be selectively engaged with any of the strikers when drawn into either of said grooves, and lock grooves cut out on the periphery of said actuating unit at spaced points; and the lock means comprises a latch engageable with either of the lock grooves when the actuating unit is rotated in either direction up to a lock position and elastic means for urging the latch toward the actuating unit.

3. The seat lock device according to claim 2, wherein the direction-setting unit comprises elastic means, one end of which is fixed to the case and the other end of which is fitted to an eccentric position on the actuating unit, thereby rotating the actuating unit to set it at a free position ready for selective engagement with any of the strikers.

4. The seat lock device according to claim 3, wherein the gate means is mounted concentrically with the actuating unit for rotation relative thereto and comprises a gate member provided with four arms extending substantially in radial directions, said gate member adapted to push the arms into the elongate grooves and lock grooves, thereby narrowing the opening of these grooves while all the strikers remain disengaged from both of the elongate grooves, and also to cause said arms to be rotated by engagement of a striker with any of the elongate grooves, thereby pushing said arms and causing any of the arms to be retracted from the lock groove with which the latch is to be engaged in order to broaden the opening of the lock groove.

5. The seat lock device according to claim 4, wherein the releasing mechanism comprises a connector fixed to the latch and a shifting mechanism for moving the connector against the force of the elastic means provided in the lock means, thereby releasing the latch from the lock groove.

* * * * *